United States Patent [19]
Kim et al.

[11] Patent Number: 5,790,373
[45] Date of Patent: Aug. 4, 1998

[54] DISK DRIVE LOADING MECHANISM

[75] Inventors: Sung Kim; Christopher B. Fruhauf, both of Palo Alto, Calif.

[73] Assignee: Silicon Graphics, Inc., Mountain View, Calif.

[21] Appl. No.: 713,601

[22] Filed: Sep. 13, 1996

[51] Int. Cl.$^6$ .................. G06F 1/16; H05K 5/02
[52] U.S. Cl. .................. 361/685; 361/727; 360/137; 439/157; 439/160
[58] Field of Search .................. 361/683–686, 361/724–727; 312/332.1, 333, 223.2; 360/97.01, 137; 439/157, 160; 364/708.1; G06F 1/16

[56] References Cited

U.S. PATENT DOCUMENTS

| | | | |
|---|---|---|---|
| 4,833,554 | 5/1989 | Dalziel et al. | 360/98.04 |
| 4,982,303 | 1/1991 | Krenz | 360/137 |
| 5,077,722 | 12/1991 | Geist et al. | 369/75.1 |
| 5,269,698 | 12/1993 | Singer | 439/157 |
| 5,340,340 | 8/1994 | Hastings et al. | 439/64 |
| 5,557,499 | 9/1996 | Reiter et al. | 361/685 |

*Primary Examiner*—Lynn D. Feild
*Attorney, Agent, or Firm*—Wagner, Murabito & Hao

[57] ABSTRACT

A connection mechanism which will positively lock a disk drive storage device to a computer housing is disclosed. A cam which may rotate within a predetermined range of motion is attached to the disk drive housing. The disk drive is coupled to a computer by the insertion of the disk drive into the housing of the computer such that the disk drive housing engages a post located within the computer housing. A channel within the disk drive housing guides the disk drive housing into the housing. Alignment pins align a connector located on the disk drive housing with a connector receptacle. The cam may then be rotated such that the cam engages the post, thereby pulling the disk drive housing into the computer housing. In the engaged position, the disk drive housing is positively secured to the computer housing since the pivot point about which the cam rotates is aligned with the post such that motion of the computer housing will not dislodge the disk drive housing. Detent bumps located on the cam and located on the disk drive housing also maintain the cam in the closed position.

7 Claims, 7 Drawing Sheets

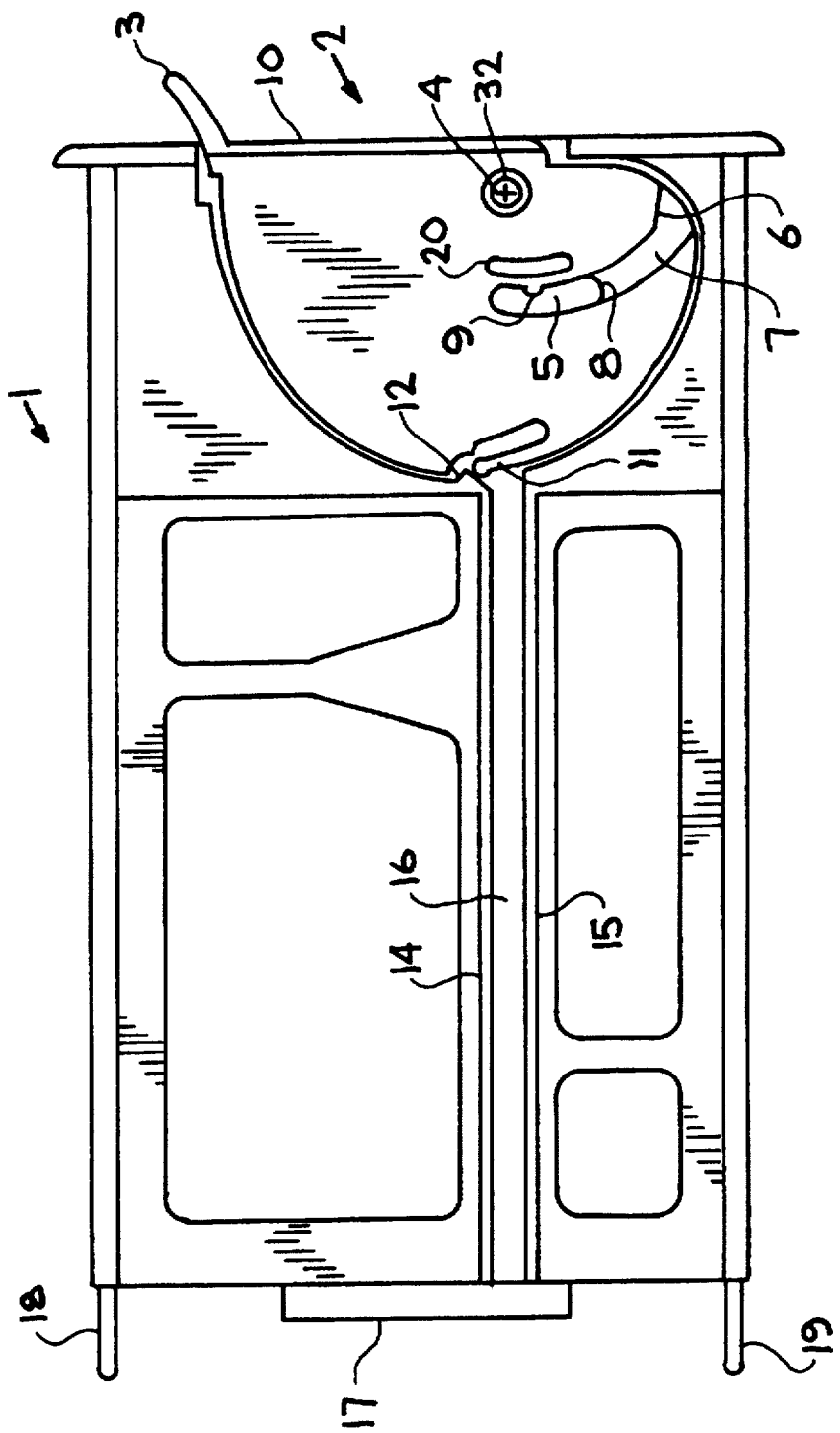

DISK DRIVE LOADING MECHANISM

TECHNICAL FIELD

The present claimed invention relates to the field of disk drives. More specifically, the present claimed invention relates to an improved loading mechanism for a disk drive.

BACKGROUND ART

Prior art connection mechanisms for attaching a disk drive to a computer require that the disk drive be inserted into an opening in the computer. Typically, the computer housing must first be removed and the disk drive is attached to the frame of the computer using screws. The disk drive is electrically coupled to the computer by one or more connector receptacles which are manually attached to connectors located on the disk drive. Once the disk drive is electrically coupled and physically attached to the frame, the computer housing is replaced. The removal and replacement of the computer housing may involve the removal and replacement of a number of screws. Thus, the process of attaching a disk drive to a computer is time consuming and difficult. Since screws may not be properly tightened and the mating of connectors to connector receptacles may not be complete, the attachment varies from installation to installation.

In an attempt to achieve simple and uniform installation of a disk drive into a computer, recent prior art systems have used rack and gear systems for alignment and attachment of disk drives. Though rack and gear systems allow the user to attach disk drives without the need to open the computer housing, rack and gear systems require a number of complex parts that must be carefully and properly manipulated in order to obtain proper disk drive installation. In addition, once the disk drive is installed, a locking device is required to keep the disk drive in place. Rack and gear systems have problems with incomplete connection when gears are not synchronized. The incomplete connection results from incomplete insertion of the disk drive. In addition, damage to the connector may result from over tightening due to improper installation or lack of synchronization. Over time, springs gears and racks suffer from reliability and maintainability problems.

Another prior art method for installation is the use of a lever which engages the leading edge of the computer housing. Though lever systems which engage the leading edge of the computer housing also allow the user to attach disk drives without the need to open the computer housing, these types of lever systems pose limitations on travel and they do not give the user sufficient mechanical advantage so as to allow for easy insertion. In addition, lever systems which engage the leading edge of the computer housing are not practical in computer systems which have spatial constraints as they require a significant amount of space below the disk drive in order to function properly. Furthermore, lever systems which engage the leading edge of the computer housing will not insert properly unless the lever is in the proper position as the disk drive is being inserted. Improper positioning of the lever may cause the lever to contact the outside of the computer housing or the outside of the leading edge and may prevent the disk drive from being inserted. In addition, movement of the computer housing will dislodge the disk drive unless a locking mechanism is used.

What is needed is a method and apparatus for achieving simple and uniform loading of a disk drive into a computer. More specifically, a loading mechanism is required which will easily align the disk drive and which will positively secure the disk drive to the computer. The loading mechanism must be inexpensive, reliable, and easy to operate.

DISCLOSURE OF THE INVENTION

The present invention meets the above need with a connection mechanism which will positively and securely attach the disk drive to the computer housing using a minimal number of parts. The above achievement has been accomplished by using a connection mechanism including a cam which positively engages a post located on the computer housing so as to lock the disk drive to the computer housing.

In one embodiment of the present invention, a cam attached to a disk drive housing rotates within a predetermined range of motion so as to secure the disk drive device to a computer. In the present embodiment, both the disk drive housing and the cam are injection molded plastic parts which are attached by means of a single screw. The cam includes a stop face which prevents the disk drive housing from being inserted more than a predetermined amount into the computer housing. This prevents improper installation and subsequent damage to the connector of the disk drive and the connector receptacle of the computer housing. The cam also includes a cantilevered snap which engages a detent bump located on the disk drive housing so as to hold the cam in the closed position. The cantilever snap and engaging detent bump keep the cam in the closed position when the disk drive housing is not inserted into a computer housing, thus preventing damage to the cam when the disk drive is not inserted into the computer housing. The cam also includes a slot which has a detent bump projecting into the slot near the end thereof. The detent bump causes an audible clicking sound when the cam is properly engaged with the computer housing. The clicking sound results from the movement of a computer housing post past the detent bump. In addition, the detent bump holds the cam in the closed position once the disk drive housing is inserted into a computer housing. The point about which the cam rotates and the position of the post are located such that once the disk drive housing is fully engaged with the computer housing, the post is directly in line with the pivot point of the cam such that motion of the computer housing will not dislodge the disk drive housing. This prevents motion of the computer housing from dislodging the disk drive housing.

The disk drive storage device is easily coupled to a computer by the insertion of the disk drive housing into the housing of the computer such that the disk drive housing engages the post located within the computer housing. A channel within the disk drive housing initially aligns the disk drive housing with the computer. Full alignment is achieved by pins projecting from the disk drive housing. Upon full manual insertion of the disk drive housing into the computer housing, the post contacts a stop face located on the cam, thereby preventing further manual insertion. Contact between the post and the front surface of the cam will rotate the cam into the proper position for contact between the post and the stop face. The cam may then be rotated such that the post engages the slot in the cam, thereby pulling the disk drive housing into the computer. The cam allows the disk drive to be advanced within the computer housing with a three to one mechanical advantage. Upon full engagement with the computer housing an audible clicking sound is heard. In the engaged position, the disk drive housing is positively secured to the computer housing.

The disk drive housing may be easily removed from the computer by the rotation of the cam such that the disk drive housing is partially removed from the computer housing. The movement disengages the connector in the disk drive housing from the connector receptacle located in the computer housing. The disk drive housing is then pulled out of the computer housing manually.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a top view of a disk drive storage device showing a cam in the closed position in accordance with the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
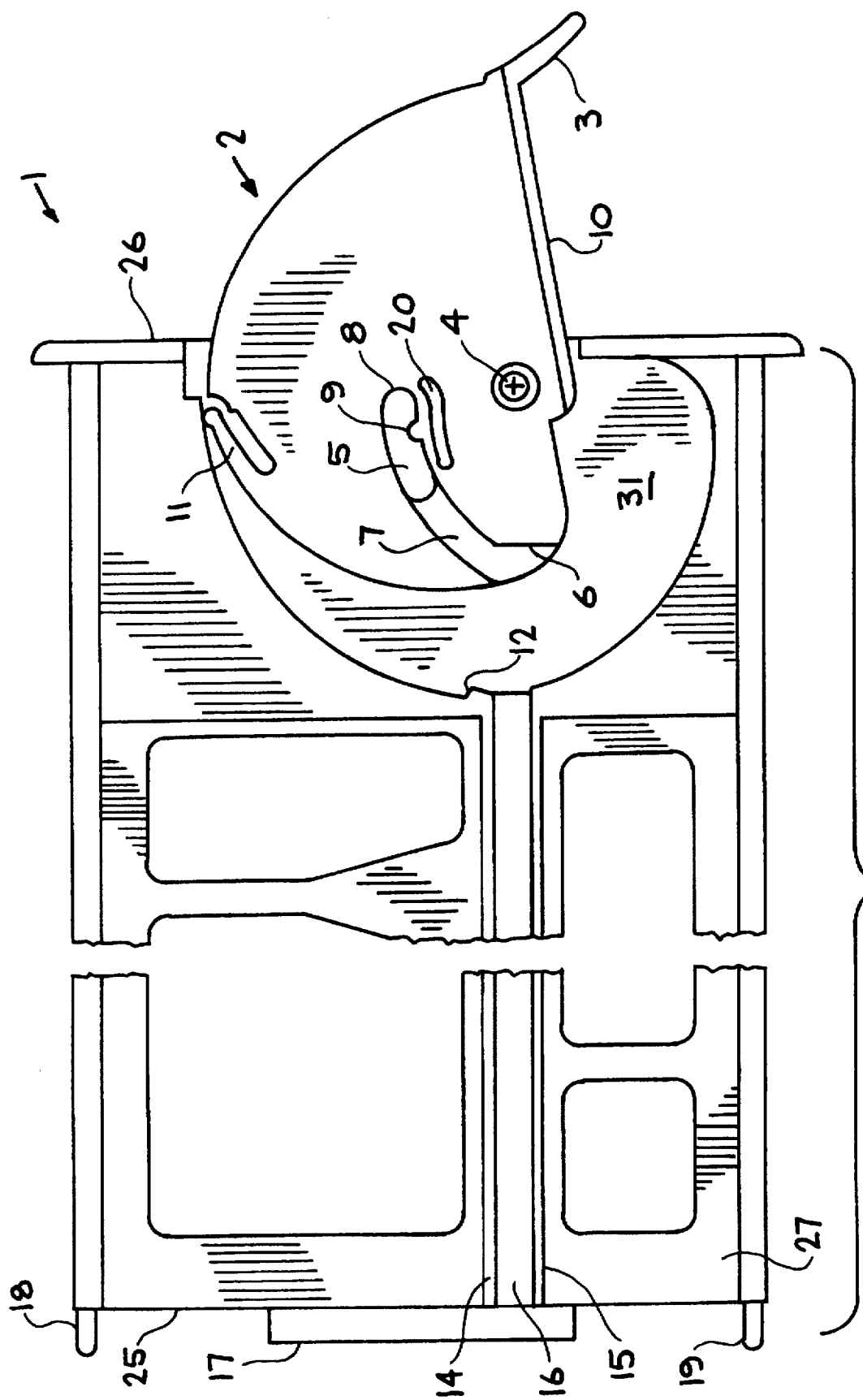
FIG. 1 is a top view of a disk drive storage device showing a cam in the open position in accordance with the present invention.

With reference now to FIG. 1, disk drive housing 1 encloses a disk drive storage device which is electrically coupled to connector 17. Connector 17 is secured to disk drive housing 1. Alignment pin 18 and alignment pin 19 extend from rear surface 25 of disk drive housing 1. Raised surface 14 and raised surface 15 extend from the top surface 27 of the disk drive housing 1 so as to form channel 16 which extends from the rear surface 25 to the cam containment region 31. Detent bump 12 extends from the disk drive housing 1 into the cam containment region 31. Cam 2 attaches to housing 1 at screw 4 such that cam 2 may rotate about an axis running through the center of screw 4. Cam handle 3 allows for easy manipulation of cam 2. Raised surface 10 extends from cam 2 such that the top surface of the cam is level with the top surface of the disk drive housing 1 along front surface 26. Stop face 6 is positioned next to slot 5 which extends to slot end surface 8. Detent bump 8 extends into slot 5 and is close to expansion opening 20. Web 7 extends below slot 5 so as to structurally strengthen cam 2.

Figure 2:
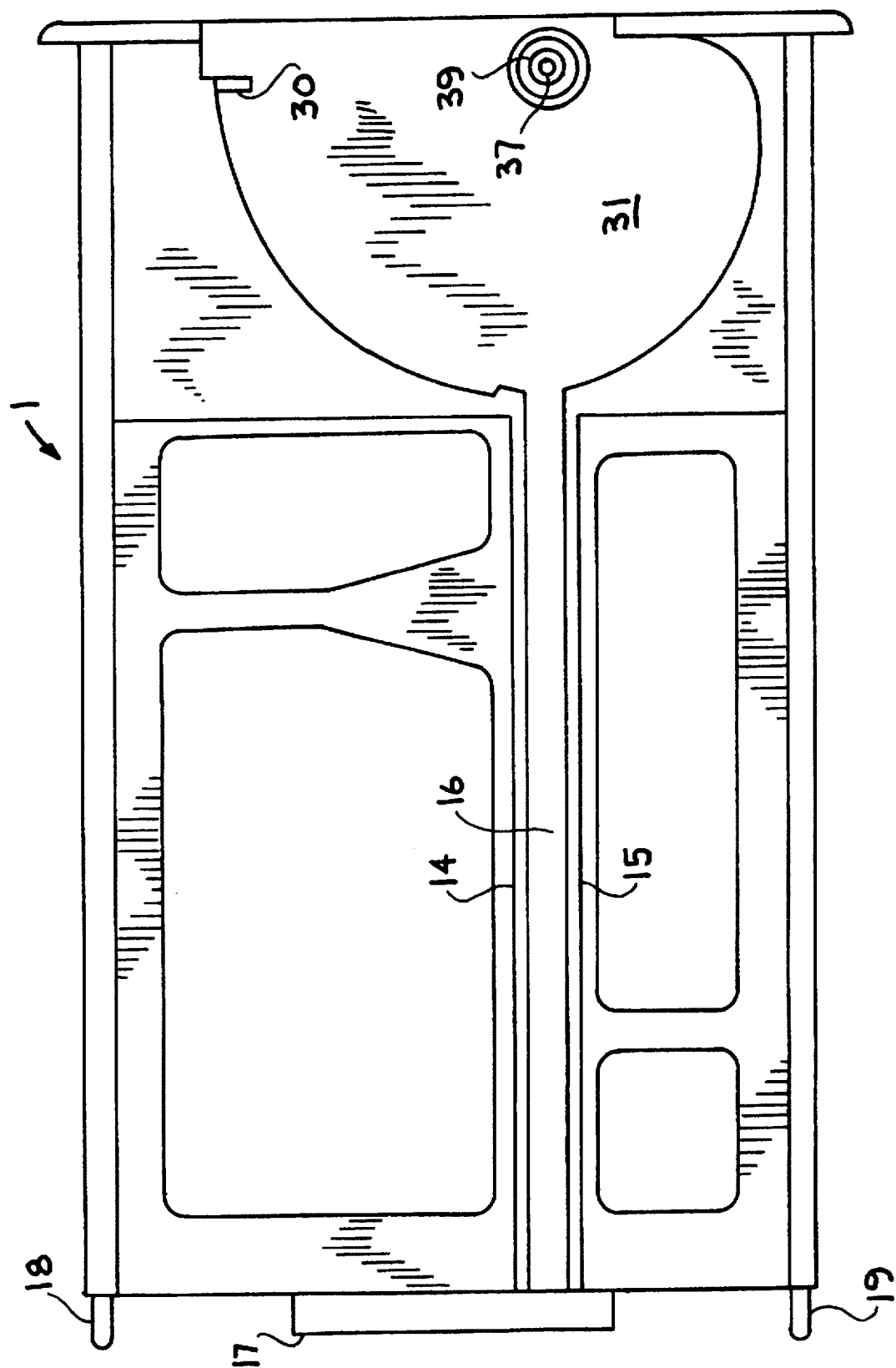
FIG. 2 is a top view of a disk drive storage device which does not have a cam attached to it in accordance with the present invention.

FIG. 2 is a top view of disk drive housing 1 having cam 2 of FIG. 1 removed. Raised stop surface 30 is located within cam containment region 31. Screw hole 37 extends into mounting boss 39.

Figure 3:
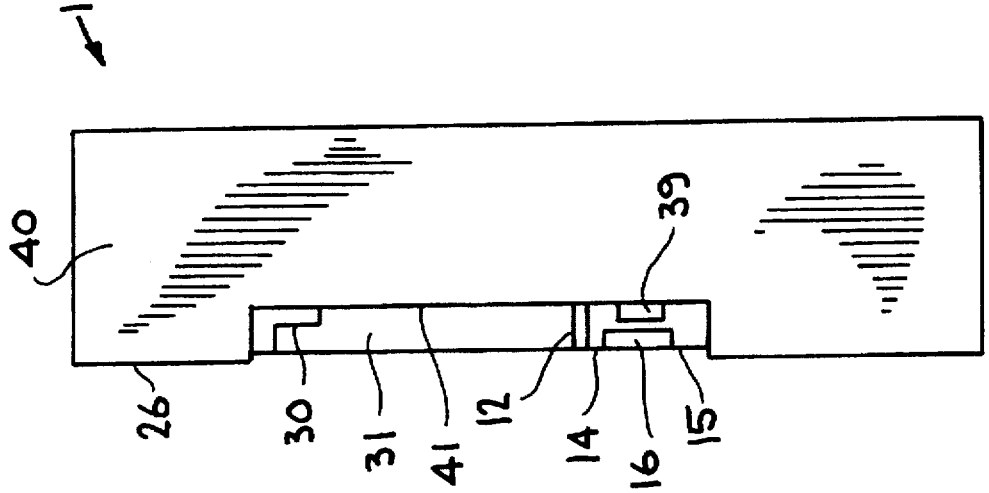
FIG. 3 is a front view of a disk drive storage device which does not have a cam attached to it in accordance with the present invention.

FIG. 3 is a front view of disk drive housing 1 which does not contain a cam. Front housing surface 40 extends across the front surface 26 of the disk drive housing 1. Raised surface 14 and raised surface 15 adjoin channel 16 which extends into cam containment region 31. Detent bump 12 extends from the surface of disk drive housing 1 into the cam containment region 31. Raised stop surface 30 and mounting boss 39 extend upward from cam containment surface 41.

Figure 4:
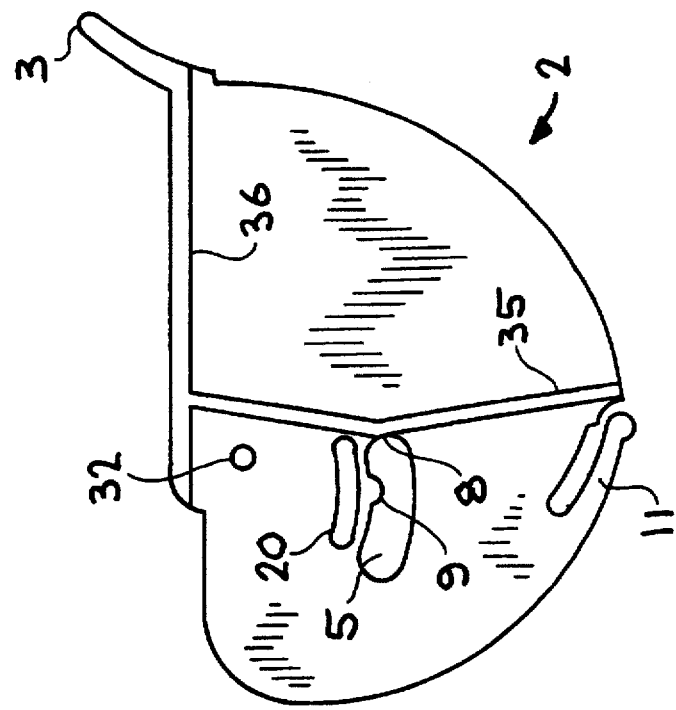
FIG. 4 is a bottom view of a cam in accordance with the present invention.

FIG. 4 is a bottom view of cam 2 showing stop block 36 which is a raised surface that prevents cam 2 from rotating beyond a closed position. FIG. 4 also shows stop block 35 which is a raised surface that prevents cam 2 from rotating beyond an open most position. Upon attachment of cam 2 into disk drive housing 1 shown in FIG. 3, stop block 35 and stop block 36 will engage with raised stop surface 30 shown in FIG. 3 so as to allow the cam to move only within a range between the open most position and the closed position. Screw hole 32 extends through the surface of cam 2.

FIG. 5 shows cam 2 rotated into disk drive housing 1 such that cam 2 is in the closed position. Screw 4 extends through screw hole 32 shown in FIG. 4 and is received by screw hole 37 shown in FIG. 2 so as to secure cam 2 to disk drive housing 1. Detent bump 12 extends from the housing 1 into the cam containment region 31 such that cantilevered snap 11 engages detent bump 12 so as to hold cam 2 in the closed position. This feature keeps cam 2 in the closed position when disk drive housing 1 is not inserted into a computer housing, thus preventing damage to cam 2 when the disk drive is not inserted into a computer housing.

Figure 6:
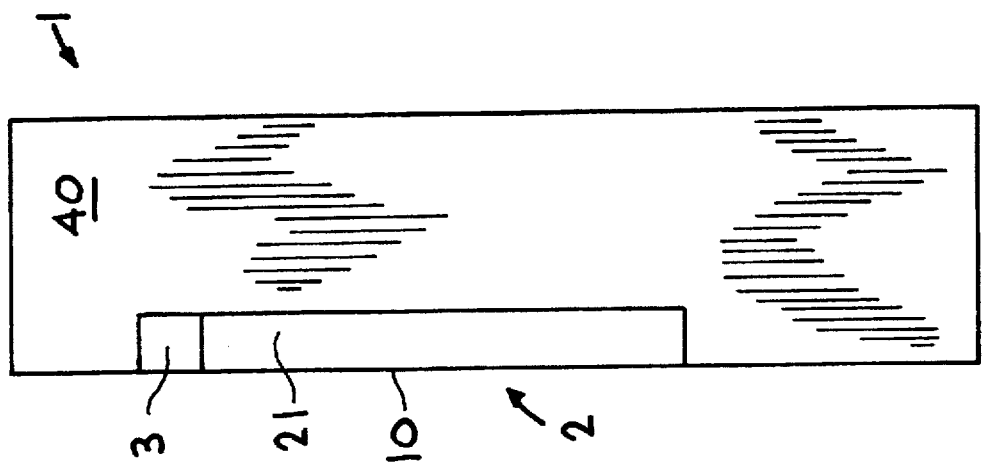
FIG. 6 is a side view of a disk drive storage device showing a cam in the closed position in accordance with the present invention.

FIG. 6 is a front view of disk drive housing 1 showing cam 2 in the closed position. Cam handle 3 projects from front surface 21 of cam 2. Front surface 21 completely fills the slot in front housing surface 40 and the top of raised surface 10 is level with the top of front housing surface 40.

Figure 7:
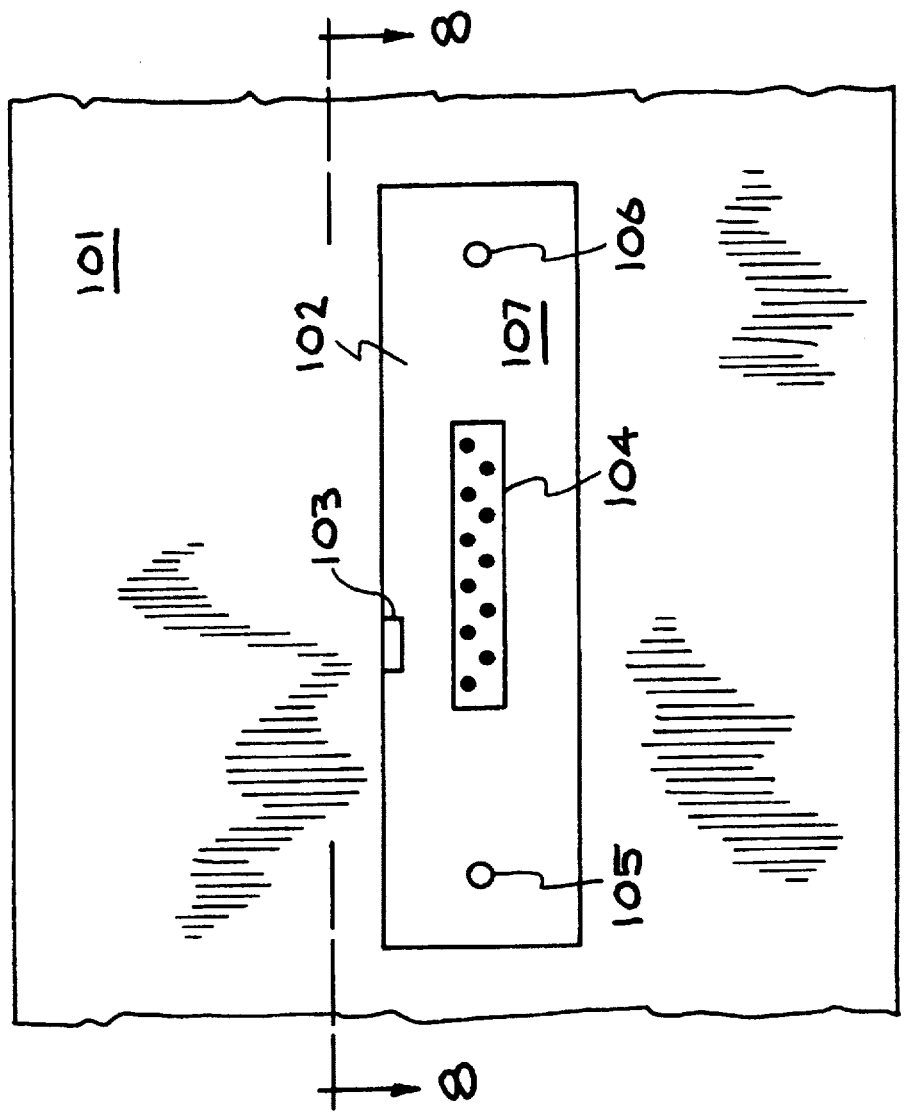
FIG. 7 shows a front view of a computer housing in accordance with the present invention.

FIG. 7 shows computer housing 101 which includes opening 102. A post 103 extends from the top of opening 102. Connector receptacle 104 extends from circuit board 107 which includes alignment opening 105 and alignment opening 106. Circuit board 107 is attached to a computer located within computer housing 101.

Figure 8:
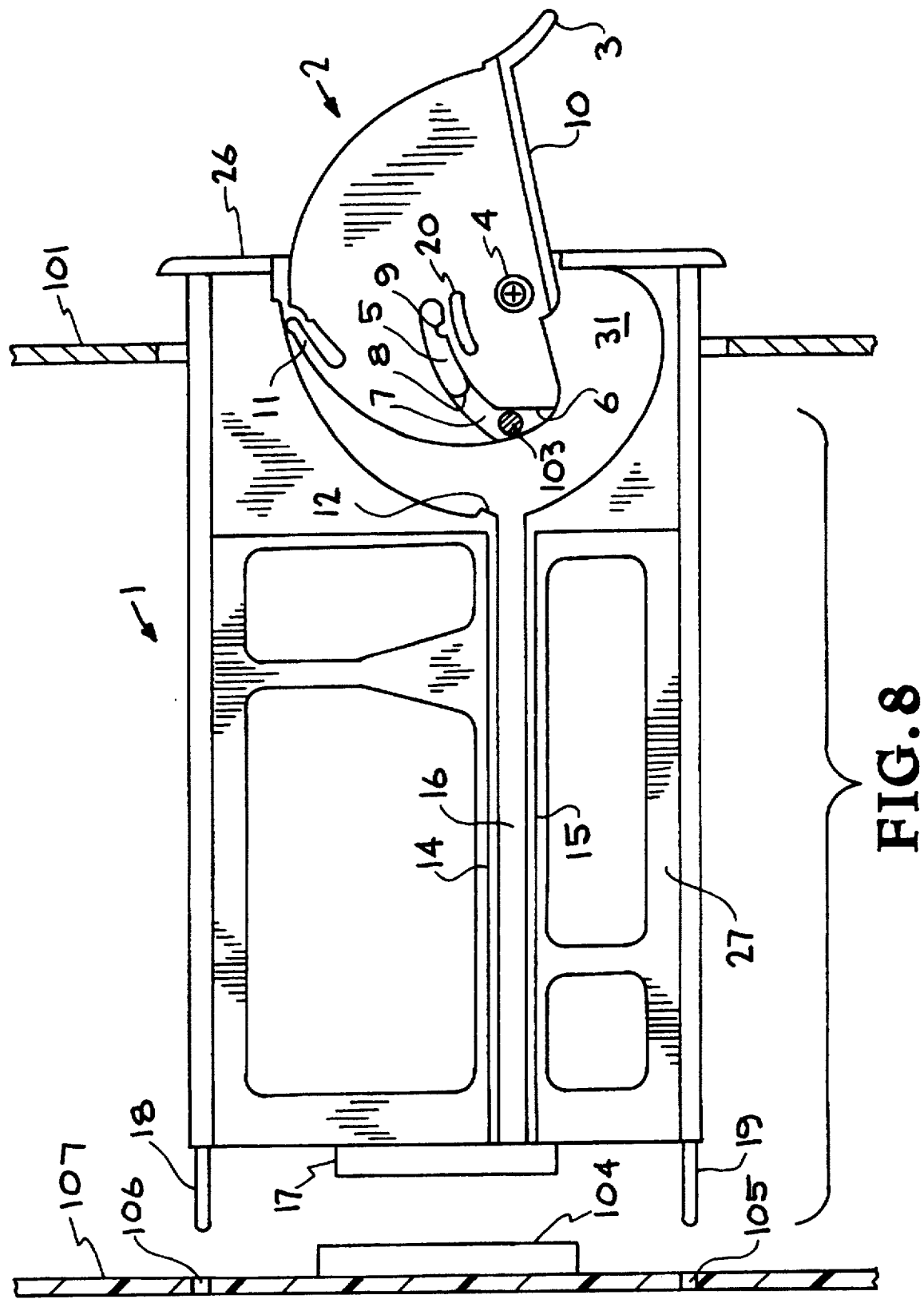
FIG. 8 is a top cross sectional view along plane A—A of FIG. 7 illustrating a computer into which a disk drive device has been inserted in accordance with the present invention.

FIG. 8 shows a schematic top view of the structure of FIG. 1 upon insertion of disk drive housing 1 into computer housing 101. As disk drive housing 1 is inserted, post 103 travels through channel 16 which initially aligns the disk drive housing 1 with connector receptacle 104 such that post 103 contacts stop face 6. Exact alignment is achieved by alignment pin 18 and alignment pin 19. Stop face 6 prevents further insertion of the disk drive housing 1. The proper alignment and the limited insertion prevents damage to connector 17 and connector receptacle 104. In the event that cam 2 is not in the open position when disk drive housing 1 is inserted into computer housing 101, post 103 will contact cam 2 and will prevent further manual insertion of disk drive housing 1. The limited manual insertion of disk drive housing 1 and proper alignment prevents damage to connector 17 and connector receptacle 104. The contour of the surface of cam 2 is such that the contact between the post 103 will apply a force to cam 2 such that cam 2 will rotate towards the open position. Even when cam 2 is in the closed position, the force of post 103 contacting cam 2 will move the cam 2 towards the open position. In the closed position post 103 contacts cantilevered snap 11 which deflects so as to allow cam 2 to rotate.

Figure 9:
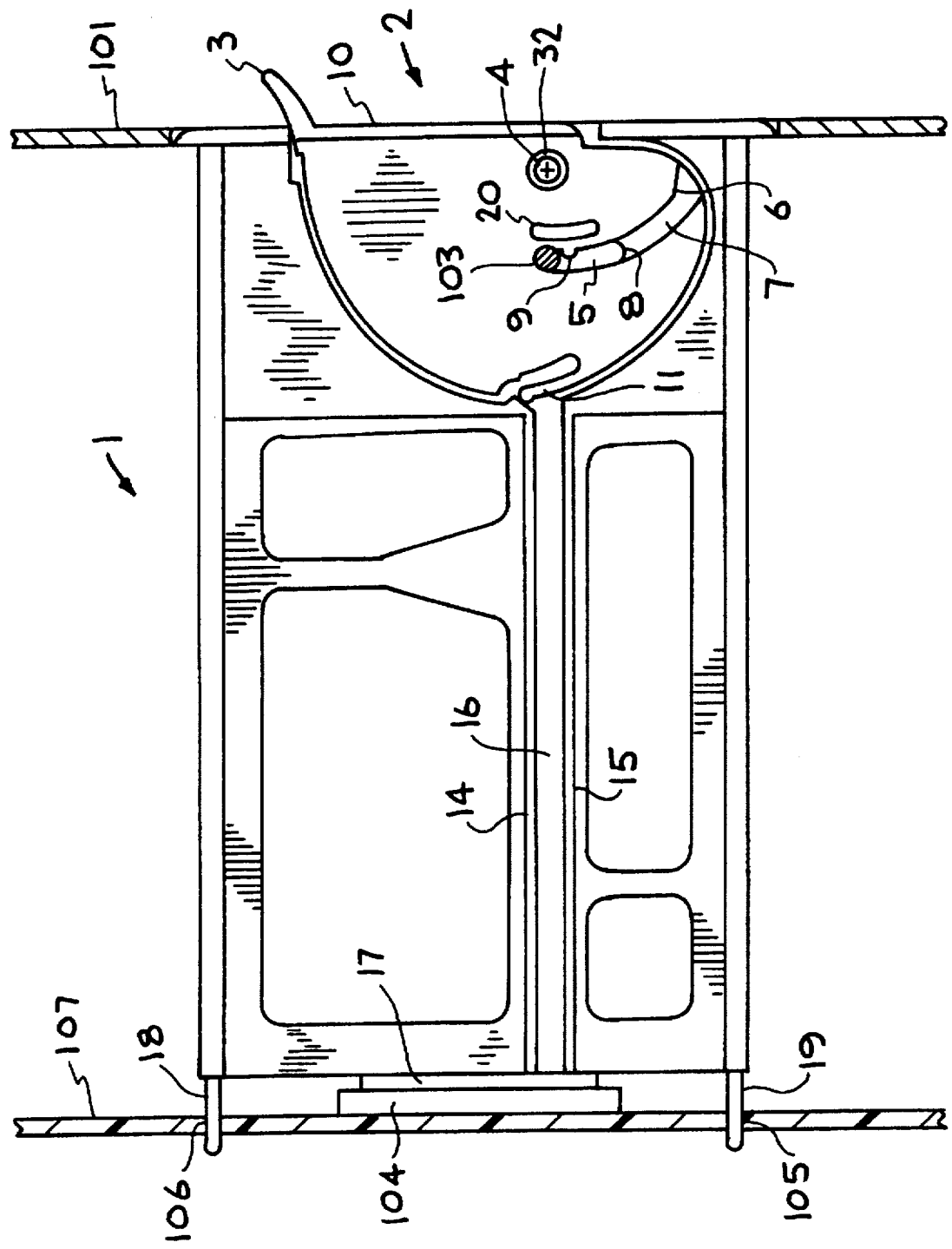
FIG. 9 is a top cross sectional view along plane A—A of FIG. 7 illustrating a computer into which a disk drive device has been inserted after full rotation of the cam into the closed position in accordance with the present invention.

FIG. 9 shows the structure of FIG. 8 upon rotation of cam 2 such that cam 2 engages post 103 within slot 5 such that cam 2 rotates into the closed position. The rotation of cam 2 pulls disk drive housing 1 into computer housing 101 such that connector 17 mates with connector receptacle 104. Alignment pin 18 mates with alignment opening 106 and alignment pin 19 mates with alignment opening 105 so as to insure the proper alignment between connector 17 and connector receptacle 104. Expansion opening 20 allows detent bump 9 to move so that post 103 may move past detent bump 9 such that it contacts slot end surface 8. As post 103 passes detent bump 9 an audible click is produced so as to indicate the disk drive housing 1 is secured to computer housing 101. In the closed position, post 103 is secured between detent bump 9 and slot end surface 8. The point about which cam 2 rotates and the position of post 103 are located such that post 103 is directly in line with the screw 4 such that motion of computer housing 101 will not dislodge disk drive housing 1. This prevents motion of computer housing 101 from dislodging disk drive housing 1 upon full engagement with the computer housing 101. Thus, in the engaged position, the disk drive housing is positively secured to computer housing 101.

The disk drive housing may be easily removed from the computer by the rotation of cam 2 such that disk drive housing 1 is partially removed from the computer housing 1. The movement disengages connector 17 from the connector receptacle 104. The disk drive housing 1 may then be pulled out of computer housing 101.

The present invention provides a method and apparatus for achieving simple and uniform loading of a disk drive into a computer. More specifically, the loading mechanism is reliable and durable as it is made from a minimum number of parts. Furthermore, the use of parts that may be formed using injection molded plastic allows for consistent and inexpensive part manufacture. In addition, the present invention includes features which allow for easy operation and which compensate for attempts to improperly install the disk drive. Thus, the present invention provides an inexpensive reliable, and easy to operate loading mechanism and method which positively secures a disk drive to a computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A loading mechanism for attaching a disk drive to a computer housing comprising:

a cam attached to a disk drive housing such that said cam is able to rotate, said cam having a slot formed therein, said slot adapted to receive a post extending into an opening in a computer housing;

a cam handle extending from said cam such that, upon insertion of said disk drive housing into an opening in a computer housing, said cam handle configured to rotate said cam thereby engaging said post within said slot so as to pull said disk drive housing into said computer housing;

a raised stop surface and wherein said cam includes a first stop block, said raised stop surface of said disk drive housing and said first stop block of said cam disposed such that, upon contact therebetween, said cam is oriented in a closed position, said contact between said raised stop surface and said first stop block preventing further closing rotation of said cam; and a second stop block, said raised stop surface of said disk drive housing and said second stop block of said cam disposed such that, upon contact therebetween said cam is oriented in an open position, said contact between said raised stop surface and said second stop block preventing further opening rotation of said cam.

2. A loading mechanism for attaching a disk drive to a computer housing comprising:

a cam attached to a disk drive housing such that said cam is able to rotate, said cam having a slot formed therein, said slot adapted to receive a post extending into an opening in a computer housing, said cam having a side surface having a contour including a stop face, said stop face disposed proximate to said slot, said stop face disposed such that, upon insertion of said disk drive housing into a computer housing with said cam in an open position, said post contacts said stop face, said contact between said post and said stop face preventing further immediate insertion of said disk drive housing into said computer housing;

a cam handle extending from said cam such that, upon insertion of said disk drive housing into an opening in a computer housing, said cam handle configured to rotate said cam thereby engaging said post within said slot so as to pull said disk drive housing into said computer housing;

a raised stop surface and wherein said cam includes a first stop block, said raised stop surface of said disk drive housing and said first stop block of said cam disposed such that, upon contact therebetween, said cam is oriented in a closed position, said contact between said raised stop surface and said first stop block preventing further closing rotation of said cam; and a second stop block, said raised stop surface of said disk drive housing and said second stop block of said cam disposed such that, upon contact therebetween said cam is oriented in an open position, said contact between said raised stop surface and said second stop block preventing further opening rotation of said cam.

3. A loading mechanism for attaching a disk drive to a computer housing comprising:

a cam attached to a disk drive housing such that said cam is able to rotate, said cam having a slot formed therein, said slot adapted to receive a post extending into an opening in a computer housing, said cam having a slot formed therein, said slot adapted to receive a post extending into an opening in a computer housing, said cam having a side surface having a contour including a stop face, said stop face disposed proximate to said slot, said cam side surface has a contour such that, upon contact between said post and said cam disposed in a closed position, further insertion of said disk drive causes said post to rotate said cam until said post contacts said stop face, thereby preventing further immediate insertion of said disk drive housing into said computer housing, said cam including a cantilevered snap and wherein said disk drive housing includes a corresponding bump such that, upon rotation of said cam into said closed position, said cantilevered snap engages said bump thereby securing said cam in said closed position;

a cam handle extending from said cam such that, upon insertion of said disk drive housing into an opening in a computer housing, said cam handle configured to rotate said cam thereby engaging said post within said slot so as to pull said disk drive housing into said computer housing;

a connector attached to said disk drive housing, said connector adapted to engage a connector receptacle disposed within a computer housing; and a channel disposed within said disk drive housing, said channel having a width such that, upon the insertion of said disk drive housing into an opening in said computer housing, said channel guides said post therethrough so as to align said connector with said connector receptacle.

4. A loading mechanism for attaching a disk drive to a computer housing comprising:

a cam attached to a disk drive housing such that said cam is able to rotate, said cam having a slot formed therein, said slot adapted to receive a post extending into an opening in a computer housing, said cam having a slot formed therein, said slot adapted to receive a post extending into an opening in a computer housing, said cam having a side surface having a contour including a stop face, said stop face disposed proximate to said slot, said cam side surface has a contour such that, upon contact between said post and said cam disposed in a closed position, further insertion of said disk drive causes said post to rotate said cam until said post contacts said stop face, thereby preventing further immediate insertion of said disk drive housing into said computer housing, said cam including a cantilevered snap and wherein said disk drive housing includes a corresponding bump such that, upon rotation of said cam into said closed position, said cantilevered snap engages said bump thereby securing said cam in said closed position, said cam including a structure strengthening web extending across said slot;

a cam handle extending from said cam such that, upon insertion of said disk drive housing into an opening in a computer housing, said cam handle configured to rotate said cam thereby engaging said post within said slot so as to pull said disk drive housing into said computer housing;

a connector attached to said disk drive housing, said connector adapted to engage a connector receptacle disposed within a computer housing; and a channel disposed within said disk drive housing, said channel having a width such that, upon the insertion of said disk drive housing into an opening in said computer housing, said channel guides said post therethrough so as to align said connector with said connector receptacle.

5. A loading mechanism for attaching a disk drive to a computer comprising:

a disk drive housing for holding a disk drive storage device, said disk drive housing further comprising a raised stop surface; and a cam including a cam handle, said cam rotatably attached to said disk drive housing such that said cam is rotatable about an axis of rotation, said cam having a slot formed therein and a slot end surface, said slot end surface positioned such that said slot end surface is aligned with said axis of rotation such that, upon insertion of said disk drive housing into a computer housing having a post such that said post contacts said cam, said cam handle is able to be rotated such that said cam engages said post, thereby pulling said post into said slot such that said post contacts said slot end surface, thereby pulling said disk drive housing into said computer housing so as to secure said disk drive housing in said computer housing such that motion of said computer housing does not dislodge said disk drive housing, said cam including a first stop block, said raised stop surface of said disk drive housing and said first stop block of said cam disposed such that, upon contact therebetween said cam is oriented in a closed position, said contact between said raised stop surface and said first stop block preventing further closing rotation of said cam, said cam further including a second stop block, said raised stop surface of said disk drive housing and said second stop block of said cam disposed such that, upon contact therebetween said cam is oriented in an open position, said contact between said raised stop surface and said second stop block preventing further opening rotation of said cam.

6. A loading mechanism for attaching a disk drive to a computer comprising:

a disk drive housing for holding a disk drive storage device, said disk drive housing further comprising a raised stop surface; and a cam including a cam handle, said cam rotatably attached to said disk drive housing such that said cam is rotatable about an axis of rotation, said cam having a slot formed therein and a slot end surface, said slot end surface positioned such that said slot end surface is aligned with said axis of rotation such that, upon insertion of said disk drive housing into a computer housing having a post such that said post contacts said cam, said cam handle is able to be rotated such that said cam engages said post, thereby pulling said post into said slot such that said post contacts said slot end surface, thereby pulling said disk drive housing into said computer housing so as to secure said disk drive housing in said computer housing such that motion of said computer housing does not dislodge said disk drive housing, said cam including a first stop block, said raised stop surface of said disk drive housing and said first stop block of said cam disposed such that, upon contact therebetween said cam is oriented in a closed position, said contact between said raised stop surface and said first stop block preventing further closing rotation of said cam, said cam further including a second stop block, said raised stop surface of said disk drive housing and said second stop block of said cam disposed such that, upon contact therebetween said cam is oriented in an open position, said contact between said raised stop surface and said second stop block preventing further opening rotation of said cam, said cam including a bump located proximate to said slot end surface such that, upon insertion of said disk drive housing into an opening in said computer housing having said post disposed therein, said cam handle may be rotated so as to engage said post until said post contacts said slot end surface, thereby pulling said post past said bump such that said post is secured between said slot end surface and said bump, the movement of said post past said bump making a clicking sound so as to indicate that said cam is in said closed position, said cam having a side surface having a contour including a stop face, said stop face disposed proximate to said slot such that, upon the insertion of said disk drive housing into said opening in said computer housing having said post disposed therein, said post contacts said stop face, thereby preventing further insertion of said disk drive housing into said computer housing, said cam side surface has a contour such that, upon the insertion of said disk drive housing into said opening in said computer housing having a post disposed therein when said cam is not in the open position, said post contacts said cam side surface so as to rotate said cam such that said post contacts said stop face, thereby preventing further immediate insertion of said disk drive housing into said computer housing, said cam further including a cantilevered snap and wherein said disk drive housing includes a corresponding bump such that said cantilevered snap engages said bump, thereby securing said cam in said closed position.

7. A loading mechanism for attaching a disk drive to a computer comprising:

a disk drive housing for holding a disk drive storage device, said disk drive housing further comprising a raised stop surface; and a cam including a cam handle, said cam rotatably attached to said disk drive housing such that said cam is rotatable about an axis of rotation, said cam having a slot formed therein and a slot end surface, said slot end surface positioned such that said slot end surface is aligned with said axis of rotation such that, upon insertion of said disk drive housing into a computer housing having a post such that said post contacts said cam, said cam handle is able to be rotated such that said cam engages said post, thereby pulling said post into said slot such that said post contacts said slot end surface, thereby pulling said disk drive housing into said computer housing so as to secure said disk drive housing in said computer housing such that motion of said computer housing does not dislodge said disk drive housing, said cam including a first stop block, said raised stop surface of said disk drive housing and said first stop block of said cam disposed such that, upon contact therebetween said cam is oriented in a closed position, said contact between said raised stop surface and said first stop block preventing further closing rotation of said cam, said cam further including a second stop block, said raised stop surface of said disk drive housing and said second stop block of said cam disposed such that, upon contact therebetween said cam is oriented in an open position, said contact between said raised stop surface and said second stop block preventing further opening rotation of said cam, said cam including a bump located proximate to said slot end surface such that, upon insertion of said disk drive housing into an opening in said computer housing having said post disposed therein, said cam handle may be rotated so as to engage said post until said post contacts said slot end surface, thereby pulling said post past said bump such that said post is secured between said slot end surface and said bump, the movement of said post past said bump making a clicking sound so as to indicate that said cam is in a closed position, said cam having a side surface having a contour including a stop face, said stop face disposed proximate to said slot such that, upon the insertion of said disk drive housing into said opening in said computer housing having said post disposed therein, said post contacts said stop face, thereby preventing further insertion of said disk drive housing into said computer housing, said cam side surface has a contour such that, upon the insertion of said disk drive housing into said opening in said computer housing having a post disposed therein when said cam is not in the open position, said post contacts said cam side surface so as to rotate said cam such that said post contacts said stop face, thereby preventing further immediate insertion of said disk drive housing into said computer housing, said cam further including a cantilevered snap and wherein said disk drive housing includes a corresponding bump such that said cantilevered snap engages said bump, thereby securing said cam in said closed position, said cam further including a cam containment surface and a channel extending along the top surface of said disk drive housing from the rear surface of said disk drive housing to said cam containment surface such that said disk drive housing may be inserted into a computer including said post such that said post may slide within said channel so as to align said disk drive housing with said computer.

* * * * *